US012768954B2

(12) United States Patent
Han et al.

(10) Patent No.: US 12,768,954 B2
(45) Date of Patent: Oct. 20, 2026

(54) WIDE FOV LIDAR AND VEHICLE WITH MULTIPLE GALVANOMETER SCANNERS

(71) Applicant: HL KLEMOVE CORP., Incheon (KR)

(72) Inventors: HakGu Han, Gyeonggi-do (KR); HoSeok Shin, Gyeonggi-do (KR); ChulSeung Lee, Gyeonggi-do (KR); SeongHee Jeong, Gyeonggi-do (KR); YunKi Han, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 1295 days.

(21) Appl. No.: 17/341,376

(22) Filed: Jun. 7, 2021

(65) Prior Publication Data

US 2021/0382150 A1 Dec. 9, 2021

(30) Foreign Application Priority Data

Jun. 8, 2020 (KR) ........................ 10-2020-0068985

(51) Int. Cl.

*G01S 7/481* (2006.01)
*B60W 60/00* (2020.01)
*G01S 17/08* (2006.01)
*G01S 17/931* (2020.01)

(52) U.S. Cl.

CPC ......... *G01S 7/4817* (2013.01); *B60W 60/001* (2020.02); *G01S 17/08* (2013.01); *G01S 17/931* (2020.01); *B60W 2420/403* (2013.01); *B60W 2420/408* (2024.01)

(58) Field of Classification Search

CPC ...... G01S 7/4817; G01S 17/08; G01S 17/931; G01S 7/481; B60W 60/001; B60W 2420/408

See application file for complete search history.

(56) References Cited

U.S. PATENT DOCUMENTS

| | | | | |
|---|---|---|---|---|
| 9,869,754 | B1 * | 1/2018 | Campbell | G01S 7/4814 |
| 2006/0132803 | A1 * | 6/2006 | Clair | G01B 11/245 356/614 |
| 2008/0002161 | A1 * | 1/2008 | Streid | G03B 37/02 359/451 |
| 2018/0275249 | A1 * | 9/2018 | Campbell | G01S 7/4865 |
| 2018/0284234 | A1 * | 10/2018 | Curatu | B60W 60/001 |
| 2020/0132984 | A1 | 4/2020 | Tsao et al. | |
| 2020/0379089 | A1 * | 12/2020 | Morarity | G01S 17/42 |

FOREIGN PATENT DOCUMENTS

KR 10-2019-0096865 8/2019

OTHER PUBLICATIONS

Office Action dated Dec. 27, 2023 for Korean Patent Application No. 10-2020-0068985 and its English machine translation by Google Translate.

* cited by examiner

*Primary Examiner* — Yuqing Xiao

(74) *Attorney, Agent, or Firm* — WOMBLE BOND DICKINSON (US) LLP

(57) ABSTRACT

The present disclosure relates to a wide field-of-view (FOV) lidar and a vehicle with multiple galvanometer scanners. The lidar according to an exemplary embodiment of the present disclosure includes a transmitter for generating light to output to an object, a receiver for receiving the light reflected from the object, and a signal processor for processing signals for the light of the transmitter and the receiver, wherein the transmitter includes first and second galvanometer scanners in which the direction of a rotation axis thereof is located on a line of the same axis.

11 Claims, 7 Drawing Sheets

WIDE FOV LIDAR AND VEHICLE WITH MULTIPLE GALVANOMETER SCANNERS

CROSS-REFERENCE TO RELATED APPLICATION

This application claims priority to and the benefit of Korean Patent Application No. 10-2020-0068985, filed on Jun. 8, 2020, the disclosure of which is incorporated herein by reference in its entirety.

TECHNICAL FIELD

The present disclosure relates to a lidar and a vehicle, and more specifically, the present disclosure relates to a lidar and a vehicle having a wide field of view in which the detection range is increased by applying multiple galvanometer scanners in which the directions of rotation axes are coincident.

BACKGROUND ART

In recent years, as vehicles become more intelligent, studies on autonomous vehicles, advanced driver assistance systems (ADAS) and the like have been actively conducted.

FIG. 1 shows an example of the detection ranges of various sensors applied to a vehicle.

In order to implement such an autonomous vehicle or an advanced driving assistance system, various sensors are essentially required. As illustrated in FIG. 1, these sensors include a radar, a lidar, a camera, an ultrasonic sensor and the like. In particular, in the case of a lidar, object identification accuracy is somewhat inferior, but due to the advantage of obtaining accurate distance information, it is installed and used in the front and rear of most autonomous vehicles.

Meanwhile, in the case of a lidar mounted on a vehicle, it includes a transmitter for generating light to transmit to an object, a receiver for receiving light reflected from the object and a signal processor for processing signals for the light of the transmitter and receiver. Certainly, the transmitter, receiver and signal processor are provided inside a housing, and a window cover made of a transparent material is installed in the corresponding housing to enable the entry and exit of light.

In particular, as a method for scanning light in a transmitter of a lidar, there are a mechanical scan method, the MEMS mirror scan method, a galvano scan method and the like. In the case of the mechanical scanning method, by increasing the size of a mirror by utilizing a motor, it is easy to increase the detection distance, but the volume is large.

In addition, in the case of the MEMS mirror scan method, it is a method in which the MEMS mirror is not shared in the optical paths of a transmitter and a receiver due to the limitation of the mirror size, and the scanning angle is limited. In particular, since the scanning angle is small (approximately ±15°), the cost of the MEMS mirror scan method is expensive due to the need to apply multiple MEMS configurations and the like, and optical distortion occurs as post optics and the like are applied in the front. In addition, the MEMS mirror scan method is not only vulnerable to optical noise because the receiver has a wide viewing angle, but also the optical system configuration of the transmitter is inevitably complicated due to the limitation of the mirror size.

Meanwhile, the galvano scan method applies a galvanometer scanner, and a wider scanning angle is possible compared to the MEMS mirror scan method. In a conventional galvano scan method, a first galvanometer scanner scans in a vertical direction, and a second galvanometer scanner scans in a horizontal direction to form a two-dimensional (2D) beam pattern. That is, for scanning, the first and second galvanometer scanners rotate in directions orthogonal to each other.

DISCLOSURE

Technical Problem

An object of the present disclosure is to provide a wide field-of-view lidar and vehicle in which the detection range is increased by applying multiple galvanometer scanners in which the directions of rotation axes are coincident.

However, the problems to be solved by the present disclosure are not limited to the problem mentioned above, and other problems that are not mentioned will be clearly understood by those of ordinary skill in the art to which the present disclosure pertains from the following description.

Technical Solution

In order to solve the above problems, the lidar according to an exemplary embodiment of the present disclosure includes a transmitter for generating light to output to an object; a receiver for receiving the light reflected from the object; and a signal processor for processing signals for the light of the transmitter and the receiver, wherein the transmitter includes first and second galvanometer scanners in which the direction of a rotation axis thereof is located on a line of the same axis.

The light may be scanned at a view angle extending on a plane in a direction perpendicular to the direction of the same axis through the first and second galvanometer scanners.

The first and second galvanometer scanners may have different rotation directions.

The first and second galvanometer scanners may be located at an output end of the transmitter.

The first galvanometer scanner may include a first mirror that reflects incident laser light while rotating along a rotation axis of one axis (z-axis), and the second galvanometer scanner may include a second mirror that reflects laser light reflected through the first mirror again while rotating along a rotation axis of z-axis.

The first mirror may rotate in a first rotation direction d1, and the second mirror may rotate in a second rotation direction d2 opposite to d1. In addition, laser light primarily reflected from the first mirror according to d1 may incident from one end to the other end of the second mirror, and laser light incident on the second mirror may be reflected from one direction to the other direction according to d2 in the second mirror.

The lidar according to an exemplary embodiment of the present disclosure may be applied to a vehicle.

The z-axis may be closer to the vertical direction of the vehicle than to the horizontal direction of the vehicle in the first and second galvanometer scanners.

The vehicle may be an autonomous vehicle or include an advanced driver assistance system (ADAS), and perform an autonomous driving operation or an advanced driver assistance operation using information detected by the lidar.

The receiver may include a photoelectric conversion device arranged in one dimension to receive light output from the transmitter and reflected from the object.

The lidar according to another exemplary embodiment of the present disclosure includes a transmitter for generating light to output to an object; a receiver for receiving the light reflected from the object; and a signal processor for processing signals for the light of the transmitter and the receiver, wherein the transmitter includes a light source unit for generating light, and a scanning unit for scanning light incident from the light source unit.

The scanning unit may include first and second galvanometer scanners in which the direction of a rotation axis thereof is located on a line of the same axis, and light incident from the light source unit may be scanned at a view angle extending on a plane in a direction perpendicular to the direction of the same axis through the first and second galvanometer scanners.

The vehicle according to an exemplary embodiment of the present disclosure is a vehicle including a lidar, and the lidar includes a transmitter for generating light to output to an object; a receiver for receiving the light reflected from the object; and a signal processor for processing signals for the light of the transmitter and the receiver, wherein the transmitter includes first and second galvanometer scanners in which the direction of a rotation axis thereof is located on a line of the same axis.

Advantageous Effects

The present disclosure configured as described above has an advantage of increasing the detection range by applying multiple galvanometer scanners in which the directions of the rotation axes are coincident.

In addition, since the present disclosure is a galvano scan method, miniaturization is possible, there is no optical distortion even if post optics are not applied, and it is possible to apply a high frame rate.

In addition, the present disclosure has an advantage of reducing the repetition rate of a light source, because the scan range for one time is increased.

The effects that can be obtained in the present disclosure are not limited to the aforementioned effects, and other effects not mentioned will be clearly understood by those of ordinary skill in the art to which the present disclosure pertains from the following description.

MODES OF THE INVENTION

Figure 1:
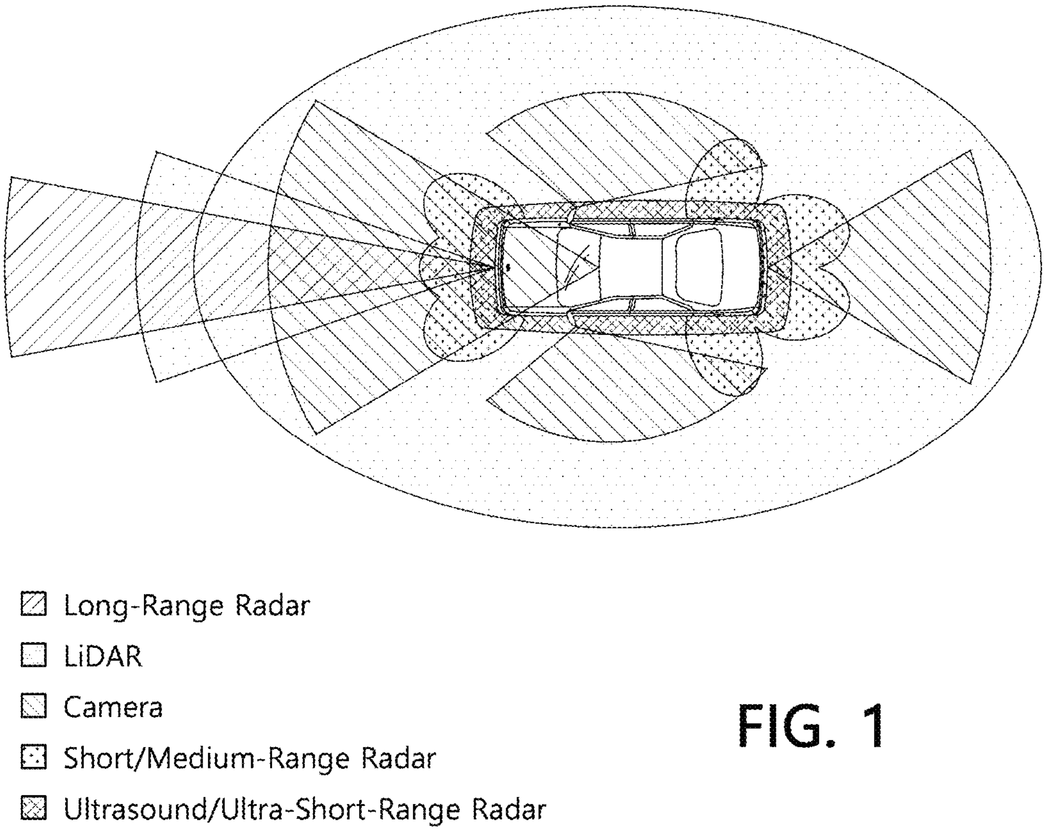
FIG. 1 shows an example of the detection ranges of various sensors applied to a vehicle.

The above objects and means of the present disclosure and effects thereof will become more apparent through the following detailed description in relation to the accompanying drawings, and accordingly, those of ordinary skill in the art to which the present disclosure pertains will be able to easily implement the technical idea of the present disclosure. In addition, in describing the present disclosure, when it is determined that a detailed description of a known technology related to the present disclosure may unnecessarily obscure the gist of the present disclosure, the detailed description thereof will be omitted.

The terms used in the present specification are for describing exemplary embodiments and are not intended to limit the present disclosure. In the present specification, the singular form also includes the plural form in some cases unless specifically stated in the phrase. In the present specification, terms such as "include", "comprise", "provide with" or "have" do not exclude the presence or addition of one or more other constitutional elements other than the mentioned constitutional elements.

In the present specification, terms such as "or", "at least one" and the like may represent one of words listed together or a combination of two or more. For example, "or B" and "at least one of B" may include only one of A or B or may include both A and B.

In the present specification, the description following "for example" may not exactly match the information presented, such as the recited characteristics, variables or values, and the exemplary embodiments of the invention according to various examples of the present disclosure should not be limited to effects such as variations including tolerances, measurement errors, limitations of measurement accuracy and other commonly known factors.

In the present specification, when a component is described as being 'connected' or 'joined' to another component, it may be directly connected or joined to the other component, but it should be understood that other components may exist in the middle. On the other hand, when a component is referred to as being 'directly connected' or'directly joined' to another component, it should be understood that there is no other component in the middle.

In the present specification, when a component is described as being 'on' or 'adjacent' of another component, it may be directly in contact with or connected to another component, but it should be understood that another component may exist in the middle. On the other hand, when a component is described as being 'directly above' or 'directly adjacent' of another component, it may be understood that another component does not exist in the middle. Other expressions describing the relationship between components, such as 'between' and 'directly between', may be interpreted in the same manner.

In the present specification, terms such as 'first' and 'second' may be used to describe various components, but the corresponding components should not be limited by the above terms. In addition, the above terms should not be interpreted as limiting the order of each component, and may be used for the purpose of distinguishing one component from another component. For example, the 'first component' may be named the 'second component', and similarly, the 'second component' may also be named the 'first component'.

Unless otherwise defined, all terms used in the present specification may be used with meanings that can be commonly understood by those of ordinary skill in the art to which the present disclosure pertains. In addition, terms defined in a commonly used dictionary are not interpreted ideally or excessively unless explicitly defined specifically.

Hereinafter, a preferred exemplary embodiment according to the present disclosure will be described in detail with reference to the accompanying drawings.

Figure 2:
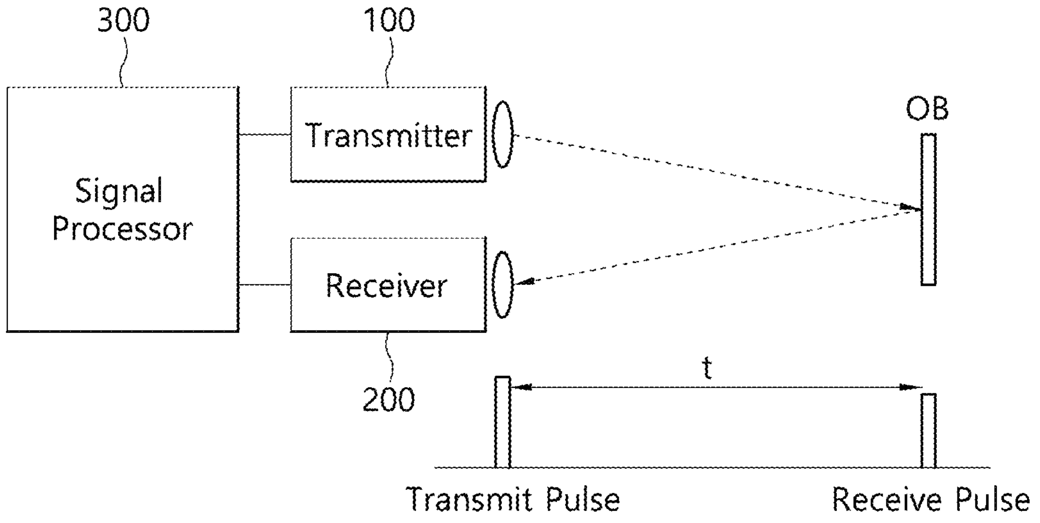
FIG. 2 shows a configuration diagram of a lidar according to an exemplary embodiment of the present disclosure.

FIG. 2 shows a configuration diagram of a lidar according to an exemplary embodiment of the present disclosure.

The lidar according to an exemplary embodiment of the present disclosure is a sensor device capable of generating information on an object OB outside a vehicle using laser light, and applies a galvano scan method. However, the lidar according to an exemplary embodiment of the present disclosure applies a method different from the conventional galvano scan method, which will be described below.

For example, the lidar according to an exemplary embodiment of the present disclosure may be implemented as a driven type or a non-driven type. In the case of the driven type, it is rotated by a motor, and objects OB around the vehicle may be detected. In the case of the non-driven type, objects OB positioned within a predetermined range with respect to the vehicle may be detected by optical steering, and in this case, the vehicle may include a plurality of non-driven type lidars. For example, the object OB may be a person, an animal, an object (a building, another vehicle, a road sign, etc.) or the like around a vehicle on which a lidar is installed.

In addition, the lidar according to an exemplary embodiment of the present disclosure detects an object OB, based on a time of flight (TOF) method, a phase-shift method through laser light or the like, and the position of the detected object OB, the distance to the detected object OB, relative speed and the like may be detected. In addition, the lidar according to an exemplary embodiment of the present disclosure may be disposed at an appropriate position of a vehicle in order to detect an object OB located in the front, rear or side of the vehicle. In this case, the vehicle may be an autonomous vehicle or may have an advanced driver assistance system (ADAS) and the like, and an autonomous driving operation or an advanced driver assistance operation may be performed using information detected by the lidar according to an exemplary embodiment of the present disclosure.

Specifically, as illustrated in FIG. 2, the lidar according to an exemplary embodiment of the present disclosure may include a transmitter 100, a receiver 200 and a signal processor 300.

The transmitter 100 is a configuration to generate laser light to transmit to an object OB. In this case, the transmitter 100 includes a light source unit for generating laser light, and a scanning unit for scanning laser light incident from the light source unit at various view angles.

That is, the light source unit may generate laser lights having the same wavelength or different wavelengths. For example, the light source unit may generate laser light having a specific wavelength or variable wavelength in a wavelength range of 250 nm to 11 μm, and may be implemented through a semiconductor laser diode capable of having a small size and low power, but is limited thereto.

Figure 3:
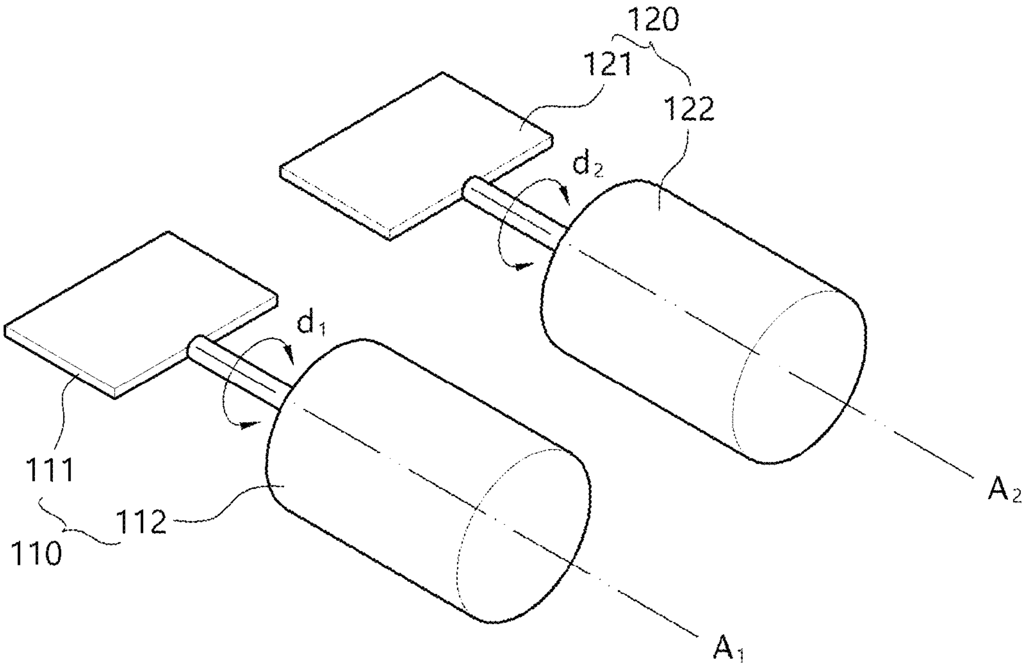
FIGS. 3 and 4 show two galvanometer scanners 110 and 120 included in the transmitter 100 of the lidar according to an exemplary embodiment of the present disclosure.
Figure 4:
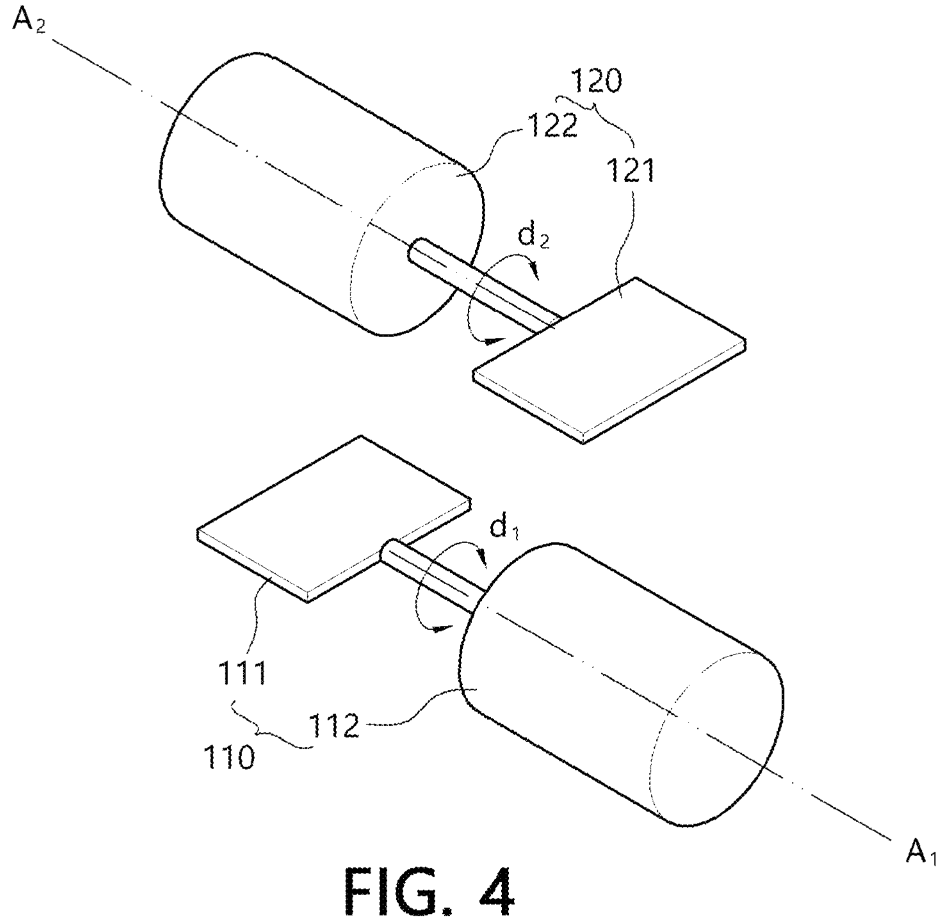

FIGS. 3 and 4 show two galvanometer scanners 110 and 120 included in the transmitter 100 of the lidar according to an exemplary embodiment of the present disclosure.

The scanning unit may scan the laser light incident from the light source unit with a wide view angle in any one direction. As illustrated in FIGS. 3 and 4, the scanning unit includes multiple galvanometer scanners 110 and 120 in which the direction of a rotation axis thereof is positioned on a line of the same axis. That is, the scanning unit may scan the laser light incident from the light source unit through multiple galvanometer scanners 110 and 120 at a wide view angle extending on a plane in a direction perpendicular to the direction of the rotation axis. In this case, each of the galvanometer scanners 110 and 120 includes mirrors 111 and 121 connected to the rotation axis, and motors 112 and 122 that rotate the rotation axis to adjust the angles of the mirrors 111 and 121. That is, the galvanometer scanners 110 and 120 may be used as a means for controlling the optical path by deflecting the angle of the laser light. In this case, each of the galvanometer scanners 110 and 120 is controlled such that the mirrors 111 and 121 rotate within a certain angular range by the motors 112 and 122.

Specifically, the first galvanometer scanner 110, which adjusts the deflection angle with respect to the laser light by a rotation axis of one axis (z-axis), includes a first mirror 111 for reflecting incident laser light, and a first motor 112 for adjusting the angle of the mirror 111 to change along the rotation axis of the z-axis. In addition, similar to the first galvanometer scanner 110, the second galvanometer scanner 120, which adjusts the deflection angle of the laser light reflected through the first mirror 111 with the corresponding z-axis as a rotation axis, may include a second mirror 121 for re-reflecting the laser light reflected through the first mirror 111 again towards an object OB, and a second motor that adjusts the angle of the second mirror 121 to change along the rotation axis of the z-axis. That is, the z-axis is an axis corresponding to the rotation axis of each of the mirrors 111 and 121, and the x-axis and y-axis are mutually orthogonal to each other and are orthogonal to the z-axis.

Unlike the conventional galvano scan method in which two galvanometer scanners rotate in directions orthogonal to each other, in the present disclosure, as illustrated in FIGS. 3 and 4, each of the rotation axis directions $A_1$ and $A_2$ is not orthogonal to each other, and instead, a new galvano scan method that operates based on two galvanometer scanners 110 and 120 that coincide on the line of the z-axis is applied. That is, the rotation axis directions A1 and A2 of each of the galvanometer scanners 110 and 120 may be the same one direction on the line of the z-axis (refer to FIG. 3) or opposite directions on the line of the z-axis (refer to FIG. 4). Accordingly, each of the mirrors 111 and 121 has rotation directions $d_1$ and $d_2$ in which the angles thereof are changed by rotating along the z-axis. That is, as the laser light is reflected by each of the mirrors 111 and 121, its direction changes on a plane formed by the x-axis and the y-axis (hereinafter, referred to as "xy plane"). That is, as the galvanometer scanners 110 and 120 rotate their rotation axes in the z-axis, laser light incident from the light source unit may be scanned at a wide view angle extending on the xy plane.

Figure 5:
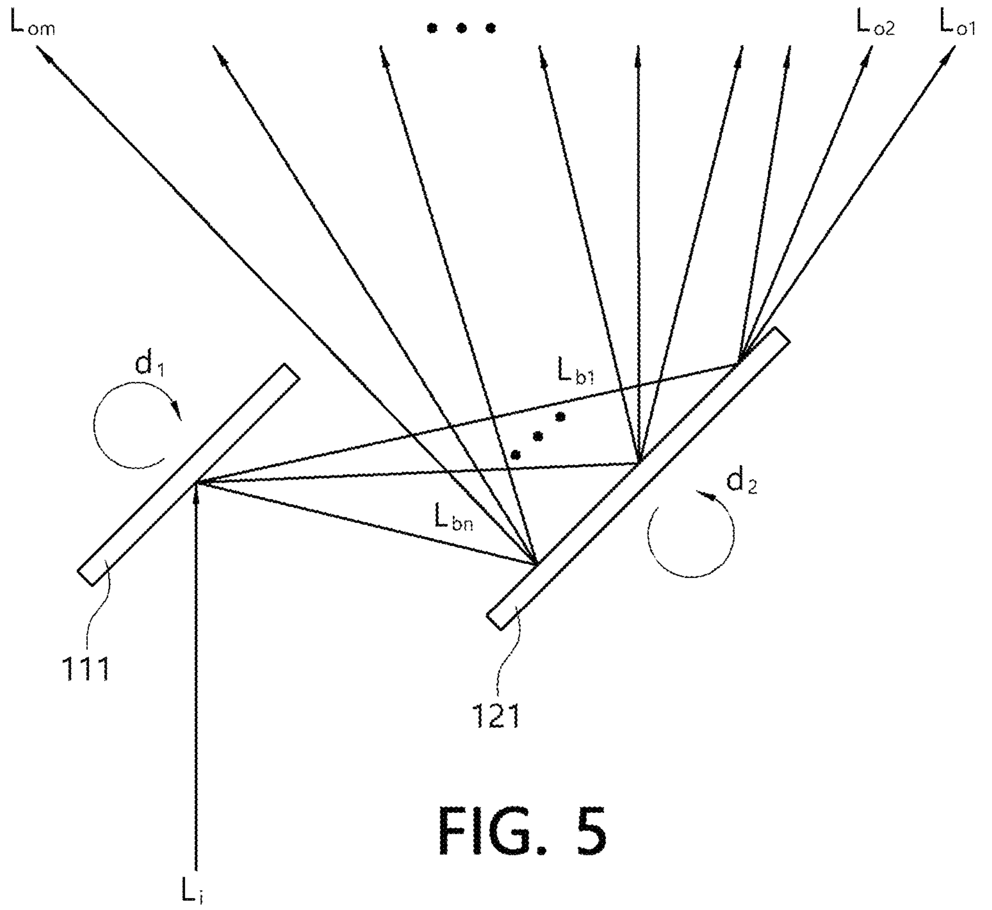
FIGS. 5 and 6 show changes in the optical transmission ranges according to the rotation of the two galvanometer scanners 110 and 120.
Figure 6:
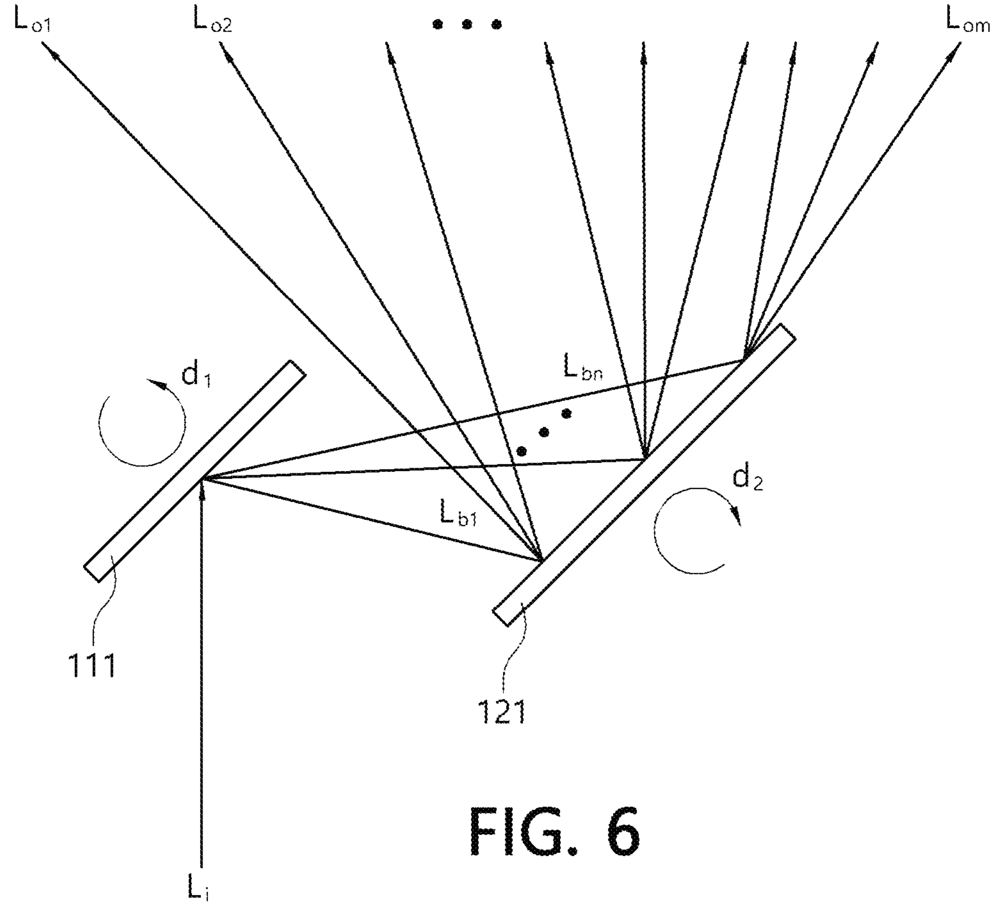

FIGS. 5 and 6 show changes in the optical transmission range according to the rotation of the two galvanometer scanners 110 and 120.

In particular, in order that the laser light finally reflected by the second mirror 121 may be scanned from one direction to the other direction or from the other direction to one direction, the rotation direction $d_1$ of the first mirror 111 and the rotation direction $d_2$ of the second mirror 121 may be preferably rotated in different directions, as illustrated in FIGS. 5 and 6.

That is, referring to FIG. 5, since $d_1$ is a clockwise direction and $d_2$ is a counterclockwise direction, the laser light primarily reflected from the first mirror 111 according to the clockwise rotation of the first mirror 111 is incident from one side to the other side of the second mirror 121 in the order of is $L_{b1}, \ldots L_{bn}$ (where n is a natural number of 2 or more). Afterwards, the corresponding incident laser light is secondarily reflected from one direction to the other direction in the order of $L_{o1}, \ldots L_{om}$ according to the counterclockwise rotation of the second mirror 121.

In addition, referring to FIG. 6, since $d_1$ is a counterclockwise direction and $d_2$ is a clockwise direction, the primarily reflected laser light from the first mirror 111 according to the counterclockwise rotation of the first mirror 111 is incident from the other side to one side of the second mirror 121 in the order of $L_{b1}, \ldots L_{bn}$ (where n is a natural number of 2 or more). Afterwards, the corresponding incident laser light is secondarily reflected from the other direction to one direction in the order of $L_{o1}, \ldots L_{om}$ according to the clockwise rotation of the second mirror 121.

Certainly, each of the galvanometer scanners 110, 120 operates such that the first mirror 111 and the second mirror 121 rotate at the same time, and thus, the laser light may be output from one direction to the other direction, or from the other direction to one direction.

Each of the galvanometer scanners 110 and 120 may be located at an output end of the transmitter 100. That is, the laser light reflected from the second mirror 121 may be incident on an object OB. In this case, the laser light may be emitted from one direction to the other direction or from the other direction to one direction in parallel along the z-axis by the action of adjusting the deflection angle according to the rotation axis of the z-axis in each of the galvanometer scanners 110, 120, and in particular, it is possible to further increase the detection range (i.e., the distance between one direction and the other direction) on a plane formed by the x-axis and the y-axis.

Figure 7:
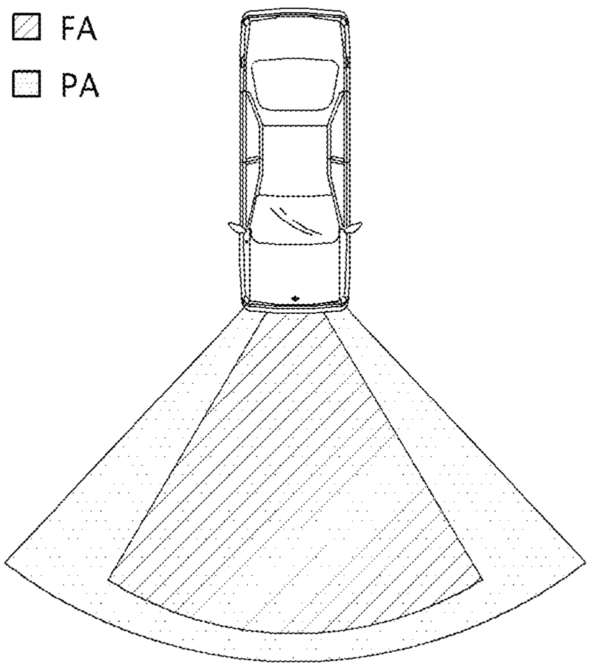
FIG. 7 shows an example of the detection range FA of a conventional lidar and the detection range PA of the lidar according to an exemplary embodiment of the present disclosure.

FIG. 7 shows an example of the detection range FA of a conventional lidar and the detection range PA of the lidar according to an exemplary embodiment of the present disclosure.

In particular, while the z-axis of each of the galvanometer scanners 110 and 120 is close to the vertical axis of a vehicle (e.g., the horizontal direction of the vehicle corresponds to a plane formed by the x-axis and the y-axis, and the z-axis corresponds to the vertical direction of the vehicle), if the laser light reflected by the second mirror 121 is finally emitted to an object OB, as illustrated in FIG. 7, the corresponding emitted laser light may have a wider detection range FA compared to the detection range PA of a conventional rider on the plane of the vehicle. In this case, the horizontal direction of the vehicle may correspond to a direction of a plane in which the vehicle moves, and the vertical direction of the vehicle may be a direction orthogonal to one surface in which the vehicle moves.

That is, if the z-axis, which is the rotation axis of each of the mirrors 111 and 121, is designed to be closer to the vertical direction of the vehicle than to the horizontal direction of the vehicle (e.g., the angle between the z-axis and the vertical axis of the vehicle is designed to be smaller than the angle between the z-axis and the horizontal axis of the vehicle), and if the rotation direction of each of the mirrors 111 and 121 is designed to be closer to the horizontal direction of the vehicle than to the vertical direction of the vehicle (e.g., the angle between the plane of the x- and y-axis and the horizontal axis of the vehicle is designed to be greater than the angle between the z-axis and the horizontal axis of the vehicle), the lidar according to an exemplary embodiment of the present disclosure may have a wider detection range FA in the corresponding vehicle.

The receiver 200 is a configuration for receiving light reflected from an object OB. For example, the receiver 200 may convert light reflected and received from the object OB into an electrical signal (a current, etc.) using a photoelectric conversion device such as a photodiode and the like. In this case, the measurement angle of the receiver 200 may be referred to as a field of view (FOV).

In particular, when the transmitter 100 scans laser light along the rotation axis of the z-axis using the first and second galvanometer scanners 110 and 120, in order to receive the reflected light of the corresponding laser light, the receiver 200 may include a photoelectric conversion device (1D array detector) arranged on a one-dimensional line.

In the case of a conventional galvano scan method in which two galvanometer scanners rotate in directions orthogonal to each other, a photoelectric conversion device (2D array detector), which is arranged in two dimensions, is required in order to receive reflected light from a receiver. However, the 2D array detector has problems of an increased volume and cost of the device. Unlike such a conventional galvano scan method, the present disclosure applies a new galvano scan method based on two galvanometer scanners 110 and 120 whose respective rotation axis directions A1 and A2 are not orthogonal to each other and coincide on a line of the z-axis. Accordingly, the present disclosure may solve the aforementioned problems, because it may receive reflected light by using a 1D array detector having a smaller volume and cost in the receiver 200.

The signal processor 300 is a configuration for processing signals for the light from the transmitter 100 and the receiver 200. That is, the signal processor 300 may include a processor that is electrically connected to the transmitter 100 and the receiver 200, processes a received signal, and generates data for an object OB based on the processed signal. In this case, the signal processor 300 may calculate a separation distance and the like of the object OB by collecting and processing data according to the corresponding light.

For example, the signal processor 300 may convert an output detected by the receiver 200 into a voltage and amplify, and then convert the amplified signal into a digital signal using an analog-to-digital converter (ADC). In addition, the signal processor 300 may perform signal processing on the changed data using a time-of-flight (TOF) method, a phase-shift method or the like in order to detect the distance, shape and the like of the object OB.

In this case, the TOF method is a method of measuring the separation distance from an object OB in which, after a laser pulse signal is emitted from a transmitter 100, the time when the pulse signal reflected from the object OB within the detection range arrives at the receiver 200 is measured. In addition, the phase-shift method is a method of calculating the corresponding time and separation distance in which, after a transmitter 100 emits a laser beam that is continuously modulated with a specific frequency, the amount of phase change of the signal reflected and returned from an object within the detection range is measured.

The lidar according to an exemplary embodiment of the present disclosure as described above has an advantage of increasing the detection range by applying multiple galvanometer scanners in which the directions of the rotation axes are coincident. In addition, since the present disclosure is a galvano scan method, miniaturization is possible, there is no optical distortion even if post optics are not applied, and it is possible to apply a high frame rate. In addition, the present disclosure has an advantage of reducing the repetition rate of a light source, because the scan range for one time is increased.

Although specific exemplary embodiments have been described in the detailed description of the present disclosure, various modifications are possible without departing from the scope of the present disclosure. Therefore, the scope of the present disclosure is not limited to the described exemplary embodiments, and should be defined by the claims to be described below and equivalents to the claims.

EXPLANATION OF REFERENCE NUMERALS

| | |
|---|---|
| 100: Transmitter | 110, 120: Galvanometer scanners |
| 111, 121: Minors | 112, 122: Motors |

The invention claimed is:

1. A lidar, comprising:

a transmitter configured to generate a plurality of first laser pulses in a first direction to detect an object;

a receiver configured to receive a laser pulse reflected from the object;

a first galvanometer scanner comprising a first mirror, the first mirror being configured to move in a first rotating direction, the first rotating direction being about a first axis;

a second galvanometer scanner comprising a second mirror, the second mirror being configured to move in a second rotating direction opposite to the first rotating direction, the second rotating direction being about a second axis, the second axis being parallel to the first axis; and a signal processor configured to process signals of the transmitter and the receiver, wherein the first mirror is further configured to reflect and deflect the plurality of first laser pulses to a second direction, the second direction extending across a first range, wherein the second mirror is further configured to reflect and deflect a plurality of second laser pulses to a third direction, the second laser pulses being reflected and deflected by the first mirror, the third direction extending across a second range, wherein the second range is wider than the first range, wherein the lidar is installed in a vehicle.

2. The lidar of claim 1, wherein a plurality of third laser pulses are deflected at a view angle extending on a plane perpendicular to the first axis, the third laser pulses being reflected and deflected by the second mirror.

3. The lidar of claim 1, further comprising:

a first motor configured to rotate the first mirror; and a second motor configured to rotate the second mirror.

4. The lidar of claim 1, wherein the vehicle is an autonomous vehicle or comprises an advanced driver assistance system (ADAS), and performs an autonomous driving operation or an advanced driver assistance operation using information detected by the lidar.

5. The lidar of claim 1, wherein the receiver comprises a photoelectric conversion device arranged in one dimension to receive the laser pulse reflected from the object.

6. A vehicle comprising a lidar, wherein the lidar comprises:

a transmitter configured to generate a plurality of first laser pulses in a first direction to detect an object;

a receiver configured to receive a laser pulse reflected from the object;

a first galvanometer scanner comprising a first mirror, the first mirror being configured to move in a first rotating direction, the first rotating direction being about a first axis;

a second galvanometer scanner comprising a second mirror, the second mirror being configured to move in a second rotating direction opposite to the first rotating direction, the second rotating direction being about a second axis, the second axis being parallel to the first axis; and a signal processor configured to process signals of the transmitter and the receiver, wherein the first mirror is further configured to reflect and deflect the plurality of first laser pulses to a second direction, the second direction extending across a first range, wherein the second mirror is further configured to reflect and deflect a plurality of second laser pulses to a third direction, the second laser pulses being reflected and deflected by the first mirror, the third direction extending across a second range, wherein the second range is wider than the first range.

7. The vehicle of claim 6, wherein a plurality of third laser pulses are deflected at a view angle extending on a plane perpendicular to the first axis, the third laser pulses being reflected and deflected by the second mirror.

8. The vehicle of claim 6, further comprising:

a first motor configured to rotate the first mirror; and a second motor configured to rotate the second mirror.

9. The vehicle of claim 6, wherein the first mirror and the second mirror are disposed such that the first axis is closer to the vertical direction of the vehicle than to the horizontal direction of the vehicle.

10. The vehicle of claim 6, wherein the vehicle is an autonomous vehicle or comprises an advanced driver assistance system (ADAS), and performs an autonomous driving operation or an advanced driver assistance operation using information detected by the lidar.

11. The vehicle of claim 6, wherein the receiver comprises a photoelectric conversion device arranged in one dimension to receive the laser pulse reflected from the object.

* * * * *